June 20, 1950  W. A. RINGLER  2,512,383
CONTAINER FOR SOLID AND LIQUID FOOD PRODUCTS
Filed Nov. 10, 1947  2 Sheets-Sheet 1
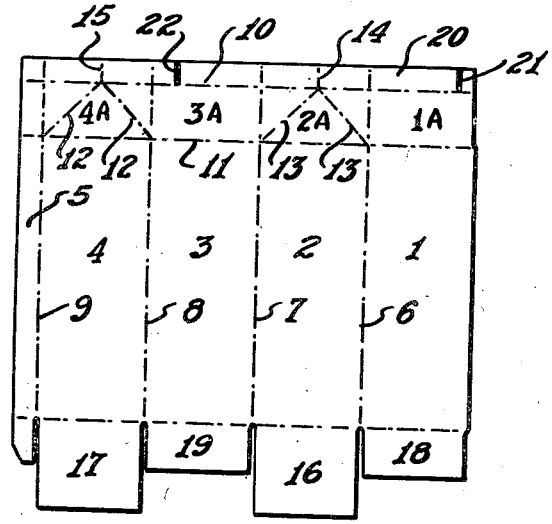
FIG. 1.
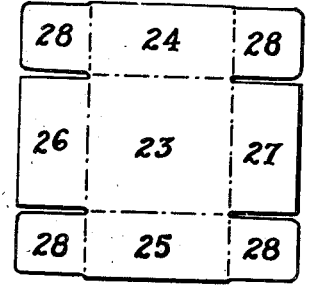
FIG. 2.
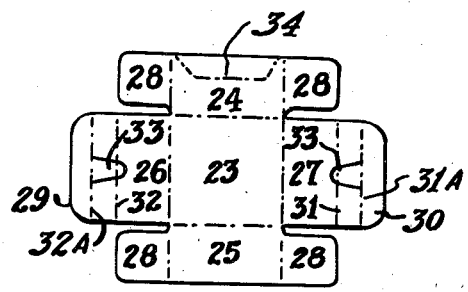
FIG. 2a.
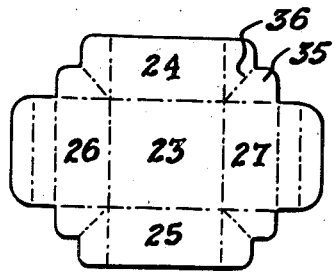
FIG. 3.
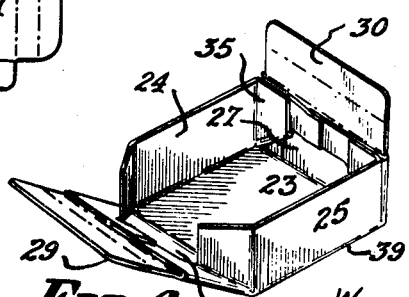
FIG. 6.
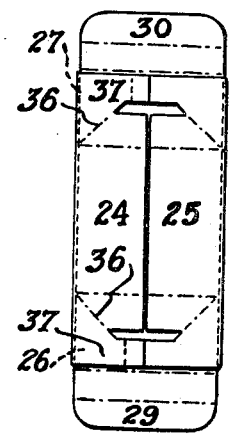
FIG. 4.
FIG. 5.
INVENTOR.
WILLIAM A. RINGLER.
BY Allen & Allen
ATTORNEYS.

June 20, 1950     W. A. RINGLER     2,512,383
CONTAINER FOR SOLID AND LIQUID FOOD PRODUCTS
Filed Nov. 10, 1947     2 Sheets-Sheet 2
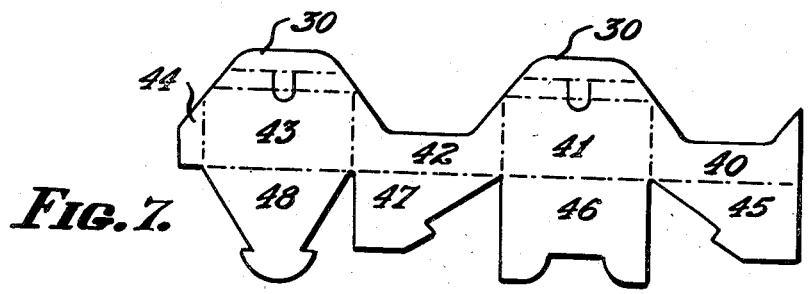
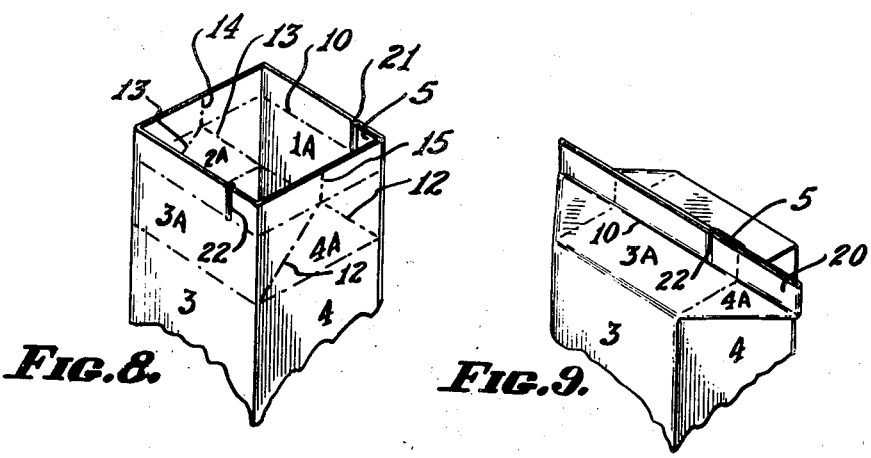
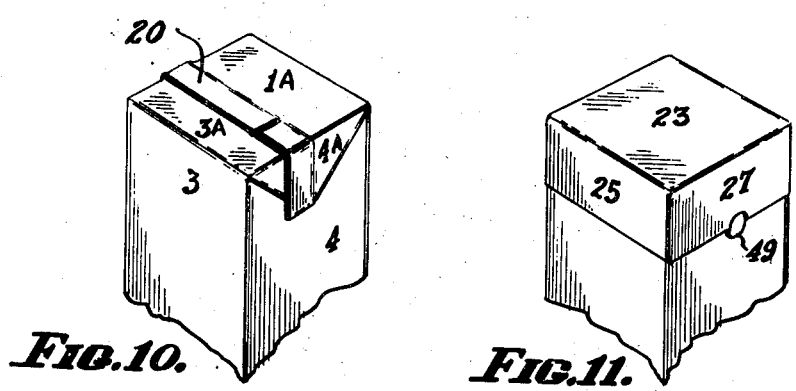
INVENTOR.
WILLIAM A. RINGLER.
BY Allen & Allen
ATTORNEYS.

Patented June 20, 1950

2,512,383

UNITED STATES PATENT OFFICE 2,512,383

CONTAINER FOR SOLID AND LIQUID FOOD PRODUCTS

William A. Ringler, Wayne, Pa., assignor to The Gardner Board and Carton Co., a corporation of Ohio Application November 10, 1947, Serial No. 785,131

8 Claims. (Cl. 229—45)

This is continuation in part of my application, now abandoned, Serial No. 533,828, filed May 3, 1944, and bearing the same title.

My invention relates to food containers, and primarily to container structures which may themselves be sealed tightly against loss or gain of moisture, gases, odors and the like, and against contamination. Such containers have a variety of uses for the packaging of articles, solid or granular substances, and liquids, which are adapted for delivery in fresh condition, and for the storage of products in cooled or frozen condition. The containers of the present invention are likewise adapted for the handling, storage and delivery of liquids and other materials, not necessarily food products, and I shall describe my invention in an exemplary embodiment which is an elongated container of particular utility for liquids and frozen products.

In the practice of my invention, the board from which the containers are made may be treated before or after the fabrication of the containers themselves to give it the desired qualities of vapor-, water- or oil-proofness. Also, it is preferable that the board or portions of it be treated with a thermoplastic substance so that a heat seal may be effected. The modes of treatment of the board or containers to give it or them the desired proofness and the desired heat sealing characteristics form no limitation upon the structure herein described and claimed. Since ways of imparting the desirable characteristics to board and containers are well known in the art, they will not hereinafter be described. It may be pointed out that the utility of my novel structures is not confined to instances where sealing is or must be practiced.

My invention further relates to problems incident to the use of containers which are closed by bending wall portions on transverse and diagonal score lines to bring the upper ends of the wall portions into a juxtaposed condition in the form of a fin (whereupon, if desired, the juxtaposed portions may be sealed together) whereafter the fin is laid against the container and the resultant ears or triangular ends are bent over against the container walls. To cause such containers to adequately fulfill the functions desired in my invention, it is my object to provide a means for covering and retaining the folded portions, fin and ears, for certain specific purposes.

Thus it is an object of my invention to provide a container having a fin and ear type closure, in which this closure is positively retained in position, with its parts pressed tightly together, so as the have a splash-proof construction if unsealed, and so as to maintain the integrity of an hermetic seal.

It is also my object to provide a container having a fin and ear type closure in which a seal may be effected by a sealing substance which is relatively weak in itself, but wherein the hermetic seal is preserved by the prevention of relative movement of the parts involved in the seal.

In this connection, it is also my object to provide a structure in which, along with the preservation of the seal as aforesaid, I combine a feature of ready openability. Thus my container although sealed may be opened by a simple manipulation, without cutting or tearing the container itself. In this way I provide a container which may easily be reclosed any number of times for the preservation of unused portions of its contents.

In connection with the provision of containers for food products, and in particular for milk which may be left at the home by a delivery service, it is my object to provide a container in which the closure elements are not only protected from damage and dislocation during handling and shipment, but also from dirt, from access by animals, and from other contaminating influences.

To these ends, it is also an object of my invention to provide a novel combination structure, making available a container which may be closed or closed and sealed as above set forth, with incidental advantages of cheapness, simplicity, strength and safety, as compared with structures heretofore known in the art.

These and other objects of my invention, which will be set forth hereinafter or will be apparent to one skilled in the art upon reading the specifications, I accomplish by that certain structure and arrangement of parts, and in the procedures of which I shall now describe the aforesaid exemplary embodiment. Reference is made to the drawings wherein:

Figure 1 is a plan view of a blank for a typical but non-limiting form of my main container.

Figure 2 is a plan view of a blank suitable for forming my cover member.

Figures 2a, 3 and 4 are plan views of three additional forms of cover member.

Figure 5 is a plan view of the cover blank of Figure 4 after it has been folded and glued.

Figure 6 is a perspective view of the structure of Figures 4 and 5 in partially set-up condition.

Figure 7 is a plan view of a blank for yet another cover member.

Figure 8 is a partial perspective view of a tubed container made from the blank of Figure 1 and in erected condition.

Figure 9 is a partial perspective view of the same container in initially sealed and closed condition.

Figure 10 is a partial perspective view of the container in sealed and folded condition.

Figure 11 is a partial perspective view of the container and cover in final position.

Referring to Figure 1, I have there illustrated a blank comprising body walls 1, 2, 3 and 4 and a glue flap 5 in sidewise juxtaposition and articulation. The scores are shown in dotted lines, and the main vertical scores of the structure are indicated at 6, 7, 8 and 9. Spaced from the tops of the body walls, there is a transverse score line 10, which demarks a fin, as will hereinafter be made clear; and spaced from the score line 10 inwardly of the structure, there is an additional score line 11. The specific shape and dimensions of the container body are not limitations on my invention. The body may be square or rectangular in cross-section when erected, and in the direction of the height of the body walls, it may be short or long. The exemplary embodiment herein is an elongated container, square in cross-section, and generally preferred by me for liquid products, ice creams and sherbets and other soft solids. Whatever the specific shape of the container, the distance between score lines 10 and 11, is approximately one half the distance between one of the pairs of opposite walls in the erected structure. Thus, the portion 1a demarked by scores 10 and 11 in wall 1 and the portion 3a similarly demarked in wall 3 are each in widths substantially one half the distance between walls 1 and 3 in the erected structure.

The score lines 10 and 11 also demark portions 2a and 4a of walls 2 and 4, and these portions are provided with diagonal score lines 12 and 13 as shown. From the points on score line 10 where the diagonal score lines meet, vertical scores 14 and 15 cross the fin portion. The glue flap 5 extends the full length of the body walls and is traversed by score lines 10 and 11.

The portions 1a to 4a of the body walls, together with the fin, are adapted to form a bellows folding closure of known type for one end of the container. The other end of the container may be provided with the same closure if desired; but for many purposes another type of bottom closure will suffice and may be preferred. Thus, I have shown in Figure 1 the walls 2 and 4 provided with seal end closure flaps 16 and 17 shaped to cover entirely the lower cross-section of the container; and I have shown walls 1 and 3 provided with shorter seal end flaps 18 and 19.

The structure of Figure 1 may be sent through an ordinary carton tubing and gluing machine in which the blank is bent on score lines 6 and 8, and the wall 1 is caused to overlie and be adhesively secured to the glue flap 5. The container will be shipped to the user in the knocked-down or flat, tubular condition.

The user will erect the carton as indicated in Figure 8, and the bottom may be closed in any suitable fashion. If the blank is like that shown in Figure 1, and has the end sealing flaps 16 to 19, these may be bent over and adhesively secured in known ways. Then, if desired, the entire structure may be proofed by being dipped in a proofing agent or otherwise, so that it will be adapted for the holding of liquids, substances that may become liquids, or substances having a high liquid content. Where the structure at the bottom of the tubed container is similar to that described for the top, it may be closed or closed and sealed in the way hereinafter set forth.

Figure 9 illustrates the effecting of a top closure in an initial stage. Portions 1a and 3a are bent inwardly and become the top of the container, while the portions 2a and 4a fold along the diagonal score lines and form ears. The wall portions above the score line 10 are juxtaposed, and now form an upstanding fin indicated at 20. Where the board has been suitably treated, this fin may be heat sealed as by pressing it with suitable heated elements.

The adhesive juncture of the glue flap 5 inside the wall 1 presents a certain problem in sealing because of the cut edge of the glue flap 5 being included in the fin. There may be a fissure or passageway through the seal along this cut edge unless precautions are taken to close it. One of the precautions which I preferably employ includes scoring the fin portion 20 as indicated at 21 and 22, which scores lie just off the edge of the glue flap. These scores somewhat soften and thicken the board at this point, permitting pressure elements more accurately to bring the board surfaces together, and promoting such a distribution of the thermoplastic adhesive as will close the fissure.

For some purposes, an hermetic seal is not necessary, and in this event, the step of heat sealing may be omitted. Also, it is within the purview of my invention to widen the fin 20 and provide one or both walls of it with an intermediate longitudinal score line which will permit the doubling of the fin or a fin portion upon itself so as more surely to attain a splash-proof construction in the event hermetic sealing is not practiced.

In an exemplary operation, the container, after it has been squared-up and closed at the bottom end, may be dipped in paraffin or other waxy substance in known ways. The effecting of the top closure after filling may be accomplished by the application of heat to the fin, and, if desired to adjacent parts, and a pressure sealing of the fin followed by a bending down of the fin and ears as illustrated in Figure 10. With paraffin or other weak sealing substances this procedure provides an hermetic seal; but distortion of the container parts will serve to break it. I take advantage of this in the preferred form of my invention. When access is required to the container, the lifting of the ears from the position shown in Figure 10 to the position shown in Figure 9 will serve to break the seal and permit the ready opening of the container to the form shown in Figure 8.

The structure of my invention comprises a container closed and/or sealed in the way described, and a cover member embracing the closure and protecting the closure parts from displacement or distortion, while furnishing the additional protection against contamination which has already been mentioned. Various forms of cover structures may be employed, but they comprise generally a box-like member with a top element for covering the top of the container, and sidewall elements embracing the upper portions of the side walls of the containers. Two of the side walls of the cover member lie over the turned-down ears of the container, and are so dimensioned as to cover the ears. The cover member may be held in place in various ways. When properly dimensioned it has a frictional engagement with the upper portion of the container and the ears. This frictional engagement is increased by the outward pressure of the ears due to the resilience of the board of which they are formed. I may, however, provide positive means on the cover for engagement with the ears whereby to hold the cover in place. These positive means may be abutments with which the ears engage, or they may be tuck members insertable upwardly between the container walls proper and the ears. In some forms of my cover, means are further provided for the ready removal of these tuck members to facilitate desired removal of the cover.

One form of cover blank is shown in Figure 2 where 23 is a top panel to which are articulated side walls 24 and 25 and end walls 26 and 27. The side walls are provided with tuck or glue flaps 28; and it will be clear that this structure may be set up over a block or mandrel accompanied by the adhesive union of the flaps 28 and the end walls 26 and 27 respectively. However, by proper configuration of the flaps 28, the structure can be set up over the end of the main container, should this be desired. The flaps 28 may be provided with interlocks for engagements in slits or slots in the walls 26 and 27. When the cover member illustrated in Figure 2 is set up in the form of a tray, if it is closely dimensioned, it will have a frictional fit over the top of the container and the ears and will be retained in place.

In the form of cover blanks shown in Figure 2a the end walls 26 and 27 have been provided with tuck or insertion extensions 29 and 30 articulated to these walls along score lines 31 and 32. Intermediate score lines 31a and 32a may be provided to facilitate insertion. Also, U-shaped cuts 33 may be made as shown in this figure to provide downwardly extending tabs from the tuck elements, whereby these elements may be pulled out after insertion. With a cover member having an insertion element which I have described, a positive engagement of the cover with the container may be effected, and since friction need not be relied upon, the dimensions of the cover element may be such as to provide a somewhat looser fit facilitating the installation of the cover member. If the flaps 28 are full cut, the structure of Figure 2a may be set up over the end of the main container and will retain its set-up form without adhesive union of the tabs 28 to the walls 26 and 27. The side walls 24 and 25 of the cover member may, if desired, be cut back along curved or other configured lines, as at 34 in Figure 2a.

Another form of cover member is illustrated in Figure 3 where the ends of the side and end walls are connected by articulated webs of the paper board as at 35, and where diagonal score lines 36 are formed in these webs. Those skilled in the art will understand how the structure of Figure 3 may be set up in box form, the webs 35 folding bellows-wise on the diagonal score lines. This may be done without the use of adhesive, in setting up the cover member over the top of the sealed container of Figure 10. Again the walls 24 and 25 of the cover blank of Figure 3 may be folded over onto the top panel 23 with an appropriate spotting of adhesive on those portions of the webs lying nearest the end walls 26 and 27 respectively. This will provide a knocked-down but erectable structure.

Yet another form of closure is shown in Figures 4, 5 and 6 where the ends of the side and end walls are again connected by webs 35 having diagonal score lines 36, but the webs have tongue-like extensions 37, the ends of which lie beyond the edges of the side walls. This structure may be sent through the ordinary carton tubing machines in such a way as to cause them to be folded along the score lines 38 and 39 with the application of adhesive to the end portions of a pair of the extensions 37 at each end. The structure will then appear as in Figure 5 with the ends of the extensions 37 adhered together or to the end walls 26 and 27. When such a flat tubed structure has its end walls 26 and 27 raised, bending will take place along the diagonal score lines 36, resulting in the erection of the walls 24 and 25, as illustrated in Figure 6.

As before the tuck members 29 and 30 may be provided for engagement behind the ears of the closure of the main container.

Yet another form of cover member is illustrated in Figure 7 where a blank is shown with side and end walls 40, 41, 42 and 43 in articulation together with a glue flap 44. This structure may be tubed on ordinary carton folding and gluing machinery with the adhesive union of the glue flap 44 to the edge of the wall 40. The body walls 40 to 43 will thus form a closed band capable of surrounding the upper part of my main container. At one side of the walls 40 to 43 I provide suitable closure flaps. These may be tuck end or sealed end, or of any other construction; but I have shown in Figure 7 a series of flaps 45, 46, 47 and 48 so configured in known ways that upon folding the flaps over in a certain order and applying inward pressure to them, the flaps will interlock. The walls 41 and 43 may be provided with tuck members for engagement behind the ears in the ways herein above set forth. Or again, the walls 41 and 43 may be made deep enough to bring their ends below the ends of the ears of the main container, and they may be provided with extensions which, folded back and adhered to the walls provide abutments engaging the ends of the ears and serving to maintain the cover member in place.

Other forms of cover members may likewise be employed including covers of the knocked-down, in-folded type, the essential being as set forth herein, namely, the provision of a box-like structure for enclosing the seal of the main container, preferably together with means for preventing the accidental removal of the cover. Glued bellows folding types of cover members may be held in place by engagement of extensions of the ears with the bellows folds of the cover.

Any of the cover structures which have been mentioned or described are erected over or slipped over the top of the sealed or closed container which is shown in Figure 10. If the cover is provided with tuck flaps, these tuck flaps are passed upwardly behind the container ears. This provides the composite structure illustrated in perspective in Figure 11. It may be noted that in the preferred form of my invention, I have shown in Figure 11 little tabs 49 (formed by the U-shaped cuts 33 herein above described) and extending below the terminus walls of the cover. These may readily be grasped and pulled, resulting in the withdrawal of the tuck flaps and the release of the cover member, whereupon the cover member may be removed from the container.

The composite structure herein described not only provides a container which is closed and leak-proof, but which may be hermetically sealed as described, together with means which not only maintain the upper part of the container in a sanitary condition, but structurally protect the closure and/or the seal so that in the operations of handling, shipping, delivery and the like, the closure and seal are not likely to be broken accidentally. The upper end of the container moreover is greatly reinforced and strengthened. Yet the cover may be readily removed and the container readily opened for access to its contents.

Yet another advantage of my structure is that it possesses planar, transverse closures at both ends. Thus successive containers can readily be stacked one upon another.

Modifications may be made in my invention without departing from the spirit of it. Having thus described my invention, what I claim as new and desire to secure by Letters Patent is:

1. In combination, a boxboard container capable of being sealed by means of thermoplastic adhesive and having a plurality of enclosing walls in articulation with each other, extensions on these walls also in articulation with each other, said extensions being scored to provide a fin portion and another portion which as to some of the walls is scored diagonally so as to be capable of folding to form a closure of a type resulting in the juxtaposition of the walls in the fin portion, where they may be sealed together, and extending ears, the said fin portion adapted to lie in folded condition with the said ears lying in bent-over condition against adjacent container walls, together with a cover of box-shape having a panel to overlie the top of the container and enclosing wall panels overlying portions of the walls of the container including the said bent-over ears, to protect the closure from mechanical disruption and consequent breaking of the bond, and to maintain the closure in sanitary condition, the said cover members having means for engagement with the said ears to prevent accidental removal of the cover, the said means comprising tuck portions articulated to the walls of the cover and insertable behind the said ears.

2. In combination, a boxboard container capable of being sealed by means of thermoplastic adhesive and having a plurality of enclosing walls in articulation with each other, extensions on these walls also in articulation with each other, said extensions being scored to provide a fin portion and another portion which as to some of the walls is scored diagonally so as to be capable of folding to form a closure of a type resulting in the juxtaposition of the walls in the fin portion, where they may be sealed together, and extending ears, the said fin portion adapted to lie in folded condition with the said ears lying in bent-over condition against adjacent container walls, together with a cover of box-shape having a panel to overlie the top of the container and enclosing wall panels overlying portions of the walls of the container including the said bent-over ears, to protect the closure from mechanical disruption and consequent breaking of the bond, and to maintain the closure in sanitary condition, the said cover members having means for engagement with the said ears to prevent accidental removal of the cover, the said means comprising tuck portions articulated to the walls of the cover and insertable behind the said ears, and including tabs demarked in the tucks and the said walls, by U-shaped cuts, ends of said tabs projecting below the terminus of the walls whereby to facilitate removal of the tucks.

3. In combination, a boxboard container capable of being sealed by means of thermoplastic adhesive and having a plurality of enclosing walls in articulation with each other, extensions on these walls also in articulation with each other, said extensions being scored to provide a fin portion and another portion which as to some of the walls is scored diagonally so as to be capable of folding to form a closure of a type resulting in the juxtaposition of the walls in the fin portion, where they may be sealed together, and extending ears, the said fin portion adapted to be in folded condition with the said ears lying in bent-over condition against adjacent container walls, together with a cover of box shape having a panel to overlie the top of the container and enclosing wall panels overlying portions of the walls of the container including the said bent-over ears, to protect the closure from mechanical disruption and consequent breaking of the bond, and to maintain the closure in sanitary condition, the said cover member having means for engagement with the said ears to prevent accidental removal of the cover, the said means comprising tuck portions articulated to walls of the cover and insertable behind the said ears, the said container being coated with a proofing substance which in the finished structure adheres the juxtaposed walls of the container together in the fin portion, forming an hermetic seal.

4. In combination, a boxboard container capable of being sealed by means of thermoplastic adhesive and having a plurality of enclosing walls in articulation with each other, extensions on these walls also in articulation with each other, said extensions being scored to provide a fin portion and another portion which as to some of the walls is scored diagonally so as to be capable of folding to form a closure of a type resulting in the juxtaposition of the walls in the fin portion, where they may be sealed together, and extending ears, the said fin portion adapted to lie in folded condition with the said ears lying in bent-over condition against adjacent container walls, together with a cover of box shape having a panel to overlie the top of the container and enclosing wall panels overlying portions of the walls of the container including the said bent-over ears, to protect the closure from mechanical disruption and consequent breaking of the bond, and to maintain the closure in sanitary condition, the said cover member having means for engagement with the said ears to prevent accidental removal of the cover, the said means comprising tuck portions articulated to walls of the cover and insertable behind the said ears, the said container being coated with a proofing substance which in the finished structure adheres the juxtaposed walls of the container together in the fin portion, forming an hermetic seal, the container structure including a glue flap adhered to one of the container walls and the said juxtaposed walls in said fin being scored adjacent the terminus of said glue flap to facilitate the formation of said hermetic seal.

5. In combination, a boxboard container capable of being sealed by means of thermoplastic adhesive and having a plurality of enclosing walls in articulation with each other, extensions on these walls also in articulation with each other, said extensions being scored to provide a fin portion and another portion which as to some of the walls is scored diagonally so as to be capable of folding to form a closure of a type resulting in the juxtaposition of the walls in the fin portion where they may be sealed together, and extending ears, the said fin portion adapted to lie in folded condition with the said ears lying in bent-over condition against adjacent container walls, together with a cover of box shape having a panel to overlie the top of the container and enclosing wall panels overlying portions of the walls of the container including the said bent-over ears, to protect the closure from mechanical disruption and consequent breaking of the bond, and to maintain the closure in sanitary condition, the said cover member having means for engagement with the said ears to prevent accidental removal of the cover, the said means comprising tuck portions articulated to walls of the cover and insertable behind the said ears, the said fin being folded upon itself to form a leak-proof closure.

6. In combination for the purposes described, a container body comprising enclosing walls and a glue flap in articulation, said glue flap being adhered to one of said enclosing walls whereby to form a tubular structure, closure means at one end of said tubular structure, score means in the enclosing walls at the opposite end of said structure to facilitate the formation of a closure with a fin in which portions of said enclosing walls are juxtaposed, portions covering the end of the container and portions extending therebeyond to form ears, and a cover for the end of said container comprising a blank cut and scored to provide a top panel and four articulated enclosing walls, two of said walls having tuck flap extensions for engagement behind the turned-over ears of the closed container when said cover is placed thereon.

7. In combination for the purposes described, a container body comprising enclosing walls and a glue flap in articulation, said glue flap being adhered to one of said enclosing walls whereby to form a tubular structure, closure means at one end of said tubular structure, score means in the enclosing walls at the opposite end of said structure to facilitate the formation of a closure with a fin in which portions of said enclosing walls are juxtaposed, portions covering the end of the container and portions extending therebeyond to form ears, and a cover for the end of said container comprising a blank cut and scored to provide a top panel and four articulated enclosing walls, two of said walls having tuck flap extensions for engagement behind the turned-over ears of the closed container when said cover is placed thereon, said cover comprising a tubed structure having side and end walls with their ends connected by diagonally scored webs.

8. In combination, a boxboard container capable of being sealed by means of thermoplastic adhesive and having a plurality of enclosing walls in articulation with each other, extensions on these walls also in articulation with each other, said extensions being scored to provide a fin portion and another portion which as to some of the walls is scored diagonally so as to be capable of folding to form a closure of a type resulting in the juxtaposition of the walls in the fin portion, where they may be sealed together, and extending ears, the said fin portion adapted to be in folded condition with the said ears lying in bent-over condition against adjacent container walls, together with a cover of box shape having a panel to overlie the top of the container and enclosing wall panels overlying portions of the walls of the container including the said bent-over ears, to protect the closure from mechanical disruption and consequent breaking of the bond, and to maintain the closure in sanitary condition, the said cover member having means for engagement with the said ears to prevent accidental removal of the cover, the said engagement means being abutment means on the enclosing wall panels of said cover member for engagement with marginal portions of said ears.

WILLIAM A. RINGLER.

REFERENCES CITED

The following references are of record in the file of this patent:

UNITED STATES PATENTS

| Number | Name | Date |
|---|---|---|
| 1,946,554 | Sutherland | Feb. 13, 1934 |
| 2,296,895 | Bergstein | Sept. 29, 1942 |
| 2,333,330 | Moore | Nov. 2, 1943 |
| 2,335,913 | Buttery | Dec. 7, 1943 |
| 2,346,685 | Hothersall | Apr. 18, 1944 |
| 2,362,862 | Sidebotham | Nov. 14, 1944 |
| 2,370,680 | Moore | Mar. 6, 1945 |
| 2,395,363 | Williams | Feb. 19, 1946 |
| 2,395,663 | Howard | Feb. 26, 1946 |